United States Patent
Ikeda et al.

(10) Patent No.: US 6,185,343 B1
(45) Date of Patent: *Feb. 6, 2001

(54) POSITION DETECTION SYSTEM AND METHOD

(75) Inventors: Kazutaka Ikeda, Nara; Yoshihito Hashimoto, Osaka, both of (JP)

(73) Assignee: Matsushita Electric Works, Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/008,077

(22) Filed: Jan. 16, 1998

(30) Foreign Application Priority Data

Jan. 17, 1997 (JP) .................................................. 9-006969
Aug. 29, 1997 (JP) .................................................. 9-234587

(51) Int. Cl.⁷ ...................................................... G06K 9/36

(52) U.S. Cl. .......................................... 382/291; 382/216

(58) Field of Search .................................. 382/291, 294, 382/216, 227, 295–297, 217, 218

(56) References Cited

U.S. PATENT DOCUMENTS

| | | | |
|---|---|---|---|
| 4,200,861 | 4/1980 | Hubach et al. | 340/146.3 |
| 4,521,909 | * 6/1985 | Wang | 382/227 |
| 4,736,437 | * 4/1988 | Sacks et al. | 382/216 |
| 4,864,629 | * 9/1989 | Deering | 382/216 |
| 5,163,101 | * 11/1992 | Deering | 382/216 |
| 5,872,870 | * 2/1999 | Michael | 382/291 |

FOREIGN PATENT DOCUMENTS

| | | |
|---|---|---|
| 8-147466 | 6/1996 | (JP) . |
| 8-161497 | 6/1996 | (JP) . |

OTHER PUBLICATIONS

"A Copy–Learning Model for Recognizing Patters Rotated at Various Angels", Kenichi Suzaki, et al., Jul. 7, 1993;pp. 1207–1211.

Ichiro Masaki, "Industrial Vision Systems Based on Application–Specific IC Chips", *IEICE Transactions*, vol. E 74, No. 6, Jun. 6, 1991, pp. 1728–1734, figs 1, 2, and 9, w/accompained description.

Kenichi Suzaki, Shinji Araya, and Ryozo Nakamura, "A Copy–Learning Model for Recognizing Patters Rotated at Various Angels", *2334a IEICE Transactions on Fundamentals of Electronics, Communications and Computers Sciences 76a*, No. 7, Jul. 1993; pp. 1207–1211.

(List continued on next page.)

*Primary Examiner*—Yon J. Couso
(74) *Attorney, Agent, or Firm*—Sughrue, Mion, Zinn, Macpeak & Seas, PLLC

(57) ABSTRACT

A position detection system which performs rough detection processing of detecting a rough position of an approximate position of a check object in a check range based on the comparison result of comparison processing of comparing images provided by compressing the check image and a correct solution image subjected to the detection displacement operation of displacing by rough detection displacement amount at a time in the check image, then performs precise detection processing of detecting a more precise position of the check object in the check range in the proximity of the rough position based on the comparison result of comparison processing of comparing images provided by compressing the check image and the correct solution image subjected to the detection displacement operation of displacing by rough detection displacement amount at a time in the check image at a compression rate more moderate than the previous compression rate, and detects the position of the check object in the check range in multiple steps, wherein the compression processing is average compression processing.

24 Claims, 12 Drawing Sheets

OTHER PUBLICATIONS

Katsuhiko Ueda and Yoshikazu Nakamura, "Method of Pattern Positioning for Automatic Verification of Seal Imprint", *Systems and Computer in Japan*, vol. 18, No. 1, 1987, pp. 13–22.

Xu Xinping, "Real Time Implementation of two Stage Search", Proceedings of the 1988 IEEE International Conference on Systems, Man, and Cybernetics, vol. 2, Aug. 8–12, 1988, pp. 1006–1008.

Hiroshi Tanaka, "Application of the Visual Image Processing Technology", Jul. 1, 1989, Industrial Research Association, Ltd., Japan, pp. 33–83 and 123–127.

* cited by examiner

POSITION DETECTION SYSTEM AND METHOD

BACKGROUND OF THE INVENTION

1. Field of the Invention

This invention relates to a position detection system and method using image processing so as to find a rotation angle and a coordinate for a check object.

2. Description of the Related Art

Hitherto, the following method has been known as a method of finding a rotation angle from a reference position for a check object contained in an input image (check image) given by picking up an image by an image input unit such as a TV camera: The concentration difference between the check object and background is used to binarize the input image with respect to the concentration, thereby separating the check object from the background, then a moment of inertia of the check object is found and the center position of the check object and the rotation angle of a main axis are calculated. This kind of art is adopted for position detection of parts on a manufacturing line. For example, it is used for a robot eye to control a robot for detecting orientation of supplied parts, holding the parts, and attaching the parts to predetermined positions.

The art for finding the main axis of the check object as described above involves the following problem: If the outline of the check object is a circle, the main axis cannot be found. Thus, if a character, etc., is written in check object P like a coin and the check object P contains caorientation (see FIGS. 6(a) and 6(b)), the rotation angle of the check object P cannot be found. If the outline has rotation symmetry like a square, the main axis cannot be determined one, thus a similar problem arises. Further, even if main axis M (see FIGS. 7(a) and 7(b)) can be found, information representing orientation is not contained in the main axis M. Thus, for example, when the check object P is symmetric with respect to a line as shown in FIGS. 7(a) and 7(b), if it differs in position 180 degrees, the check object P shown in FIG. 7(b) cannot be distinguished from that in FIG. 7(a).

In contrast, a pattern matching method of collating a check object with a previously entered template, thereby finding the rotation angle of the check object is known as described in Japanese Patent Publication No. Hei. 6-89341. In the art described here, particularly, an image at a corner of a part is collated as the check object, thereby decreasing the processing amount. It is considered that the art can be used to detect the rotation angle of the check object as shown in FIG. 7. However, since only the image at the corner is used, when the outline is a circle or a square, the problem remains unsolved.

Further, the following method has also been known as a method of finding a position (rotation angle and coordinate) for a check object contained in an input image (check image) given by picking up an image by an image input unit such as a TV camera:

As this kind of position detection system, hitherto a system disclosed in Japanese Patent Publication No. Hei. 6-160047 has been available. This system performs rough detection processing of detecting a rough position of an approximate position of a check object in a check range based on the comparison result of comparison processing of comparing images provided by compressing the check image and a correct solution image subjected to the detection displacement operation of displacing by rough detection displacement amount at a time in the check image, then performs precise detection processing of detecting a more precise position of the check object in the check range in the proximity of the rough position based on the comparison result of comparison processing of comparing the images provided by compressing the check image and the correct solution image subjected to the detection displacement operation of displacing by rough detection displacement amount at a time in the check image at a compression rate more moderate than the previous compression rate, and detects the position of the check object in the check range in multiple steps.

More particularly, the position detection system performs compression processing by extracting (or thinning out) some of the pixels making up the correct solution image.

The conventional position detection system, which detects the position of the check object in the check range in multiple steps, takes a shorter detection time than the time taken for accurately detecting the position of the check object in the check range from the beginning by one-step detection processing.

However, since the position detection system performs compression processing by extracting or thinning out some of the pixels making up the correct solution image, when the pixel extracted from the pixels making up the correct solution image does not have an average value and has a peculiar value, the position of the check object in the check range cannot precisely be detected (for example, when the noises are picked up).

SUMMARY OF THE INVENTION

To solve the aforementioned problems, an object of the present invention is to provide a position detection system and method using image processing and being capable of finding a rotation angle and a coordinate of a check object regardless of the shape of the check object.

According to a first aspect of the invention, there is provided a method for detecting a position of a check object using image processing, comprising the steps of: picking up an image of the check object so as to prepare a check image of the check object; preparing a reference template having a reference image of the check object; preparing a plurality of collation templates by rotating the reference template at various rotation angles; collating the collation templates with the check image so as to evaluate a correlation degree therebetween; and acknowledging a rotation angle of the reference template for preparing the collation template, which matches with the check image most exactly, as a rotation angle of the check object.

According to a second aspect of the invention, there is provided a method for detecting a position of a check object using image processing, comprising the steps of: (1) picking up an image of the check object so as to prepare a check image of the check object; (2) preparing a correct solution image having a reference image of the check object; (3) compressing the check image and the correct solution image at a given compression rate by an average compression processing which calculates an average value of a brightness in a predetermined area and adopts the average value as a brightness of one pixel of the compressed check image and the compressed correct solution image; (4) displacing the compressed correct solution image; (5) comparing the compressed check image and the compressed/displaced correct solution image so as to detect a rough position of the check object; (6) compressing the check image and the correct solution image after detecting the rough position at a compression rate more moderate than the previous compression rate by the average compression processing; (7) displacing the compressed correct solution image in a proximity of the rough position; (8) comparing the compressed check image and the compressed/displaced correct solution image so as to detect a more precise position than the rough position of the check object; and (9) repeating (3) to (8) steps while moderating the compression rate in multiple steps so as to detect the precise position of the check object.

According to a third aspect of the invention, there is provided a system for detecting a position of a check object using image processing, comprising: means for picking up an image of the check object so as to prepare a check image of the check object; means for preparing a reference template having a reference image of the check object; means for preparing a plurality of collation templates by rotating the reference template at various rotation angles; means for collating the collation templates with the check image so as to evaluate a correlation degree therebetween; and means for acknowledging a rotation angle of the reference template for preparing the collation template, which matches with the check image most exactly, as a rotation angle of the check object.

According to a fourth aspect of the invention, there is provided a system for detecting a position of a check object using image processing, comprising: means for picking up an image of the check object so as to prepare a check image of the check object; means for preparing a correct solution image having a reference image of the check object; means for compressing the check image and the correct solution image at a given compression rate by an average compression processing which calculates an average value of a brightness in a predetermined area and adopts the average value as a brightness of one pixel of the compressed check image and the compressed correct solution image; and means for comparing the compressed check image and the compressed correct solution image so as to detect a rough position of the check object, wherein the compressing means compresses the check image and the correct solution image at a compression rate more moderate than the previous compression rate by the average compression processing after detecting the rough position, the comparing means compares the compressed correct solution means and the compressed check image in a proximity of the rough position so as to detect a more precise position than the rough position of the check object, and the compressing and comparing means repeat compressing and comparing steps while moderating the compression rate in multiple steps so as to detect the precise position of the check object.

DETAILED DESCRIPTION OF THE PREFERRED EMBODIMENTS

1st Embodiment

Figure 2:
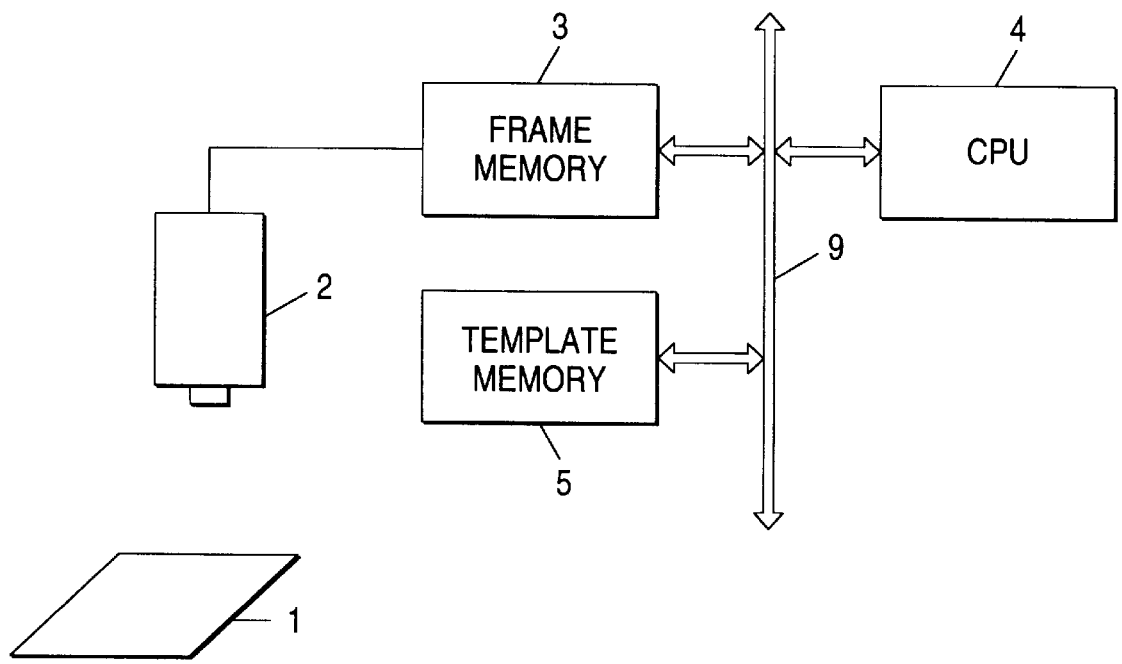
FIG. 2 is a block diagram to show the first embodiment of the invention.

As shown in FIG. 2, the image of an object 1 is picked up by an image input unit 2 made of a TV camera and analog-digital conversion and preprocessing such as smoothing are applied to the gray-scale image provided by the image input unit 2, thereby preparing an original image with noise removed (in the example shown in FIG. 2, the analog-digital conversion and preprocessing are performed by the image input unit 2) and the original image is stored in a frame memory 3 as an input image (check image). The frame memory 3 is connected via a bus 9 to a CPU (central processing unit) 4 of a microcomputer and a template memory 5 storing a reference template described later is connected to the bus 9. The template memory 5 stores a reference template as a reference shape to be collated with the image of the object 1. Here, the frame memory 2 and the template memory 5 are matched with each other in image reference orientation; the storage state of the reference template in the template memory 5 is defined as a reference position (namely, the rotation angle is 0°). For example, to use a character as a reference template, the reference template with the character normally set is stored in the template memory 5.

Figure 1:
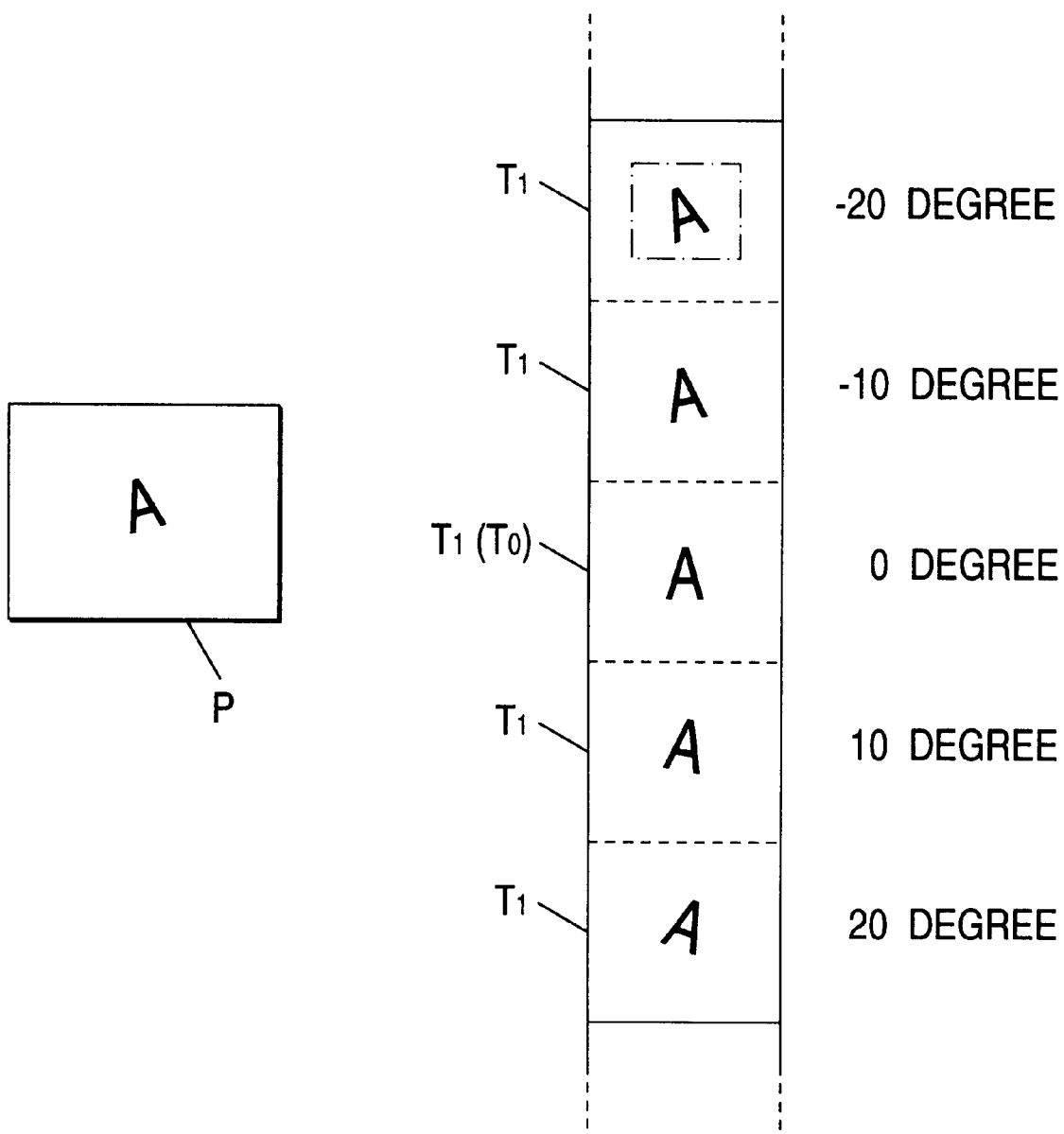
FIG. 1 is a conceptual illustration of a first embodiment of the invention.

To find a specific graphic form of the object 1 contained in the input image, namely, the position of check object P, as shown in FIG. 1, collation templates T1 provided by rotating reference template T0 at a predetermined angle at a time (in FIG. 1, 10 degrees) are prepared by the CPU 4 and are collated with the object image P. The angle which the collation template T1 most matching the object image P forms with the reference template T0 stored in the template memory 5 is acknowledged as the rotation angle of the check object P. Here, a conventional known normalization correlational method is used for collating the collation templates T1 with the check object P; a correlation function between the check object P and each collation template T1 is found and when the correlation function value reaches the maximum, the check object P and the collation template T1 are assumed to match. In the method of the embodiment, one reference template T0 is entered in the template memory 5 to be collated with the check object P, so that the memory capacity required for the template memory 5 can be lessened.

The collation templates T1 basically are prepared at equal angle intervals appropriately set as required. That is, if the angle intervals are large, the detection accuracy of the rotation angle of a check object P lowers, but the number of the collation templates to be compared with the check object P is small, so that the collation result can be obtained in a short time. In contrast, if the angle intervals are small, the detection accuracy of the rotation angle of a check object P heightens.

The frame memory 3 and the template memory 5 can share the same memory by dividing the memory area. The system can be provided by a computer system having an image input function; of course, if the CPU processing speed improves, the time interval between the instant at which an image is read and the instant at which the result is obtained is shortened.

2nd Embodiment

Figure 3:
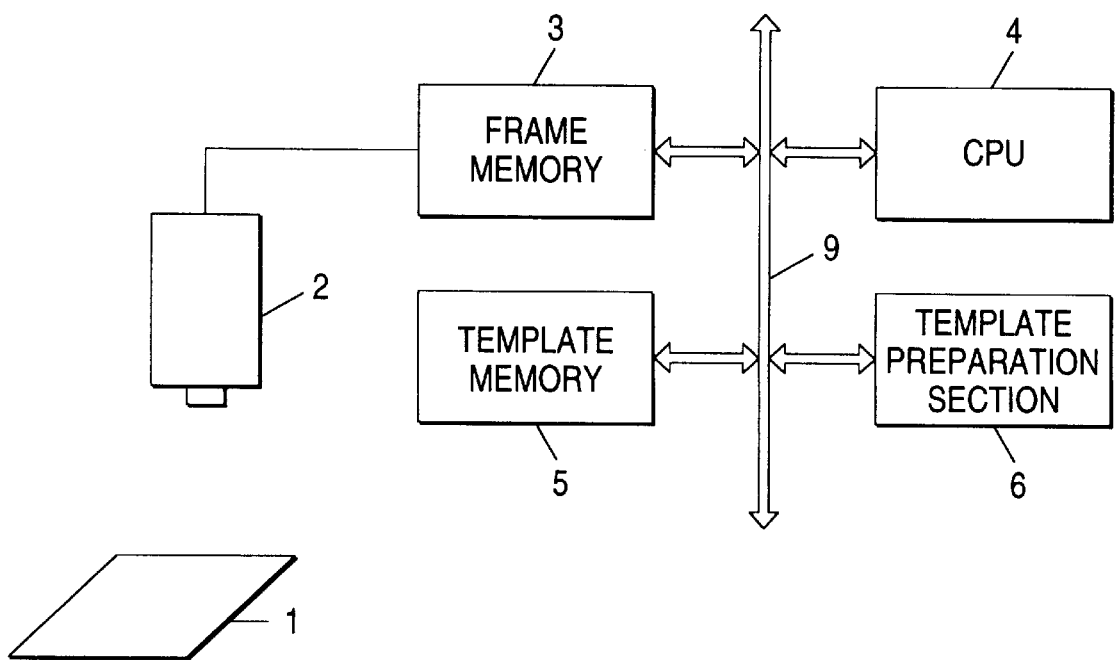
FIG. 3 is a block diagram to show a second embodiment of the invention.

In the first embodiment, the CPU 4 prepares the collation templates based on the reference template stored in the template memory 5. In a second embodiment of the invention, as shown in FIG. 3, a template preparation section 6 is provided for preparing collation templates from a reference template. If such a configuration is adopted, the template preparation section 6 can be designed to be dedicated to preparation processing of collation templates based on the reference template; a load is taken off from the CPU 4 and the processing can be speeded up as a whole. For example, the template preparation section 6 can be provided by an ASIC (application-specific IC). The CPU 4 functions mainly as a collation processing section for collating the collation templates with a check object and finding the rotation angle of the check object based on the collation result.

According to the configuration of the embodiment, the template preparation section 6 is provided, whereby load can be dispersed to the CPU 4 and the template preparation section 6 which is dedicated to preparation of the collation templates, can perform processing at high speed. Since a huge load can be taken off the CPU 4, a CPU having comparatively slow processing speed can be used as the CPU 4. Moreover, as in the first embodiment, a small-capacity memory can be used as a template memory 5. Other components and operation of the second embodiment are similar to those of the first embodiment. The template preparation section 6 only prepares the collation templates, but may also collate the collation templates with the check object.

3rd Embodiment

In the first and second embodiments, the reference templates are provided in a one-to-one correspondence with the check objects for storage in the template memory 5 and when one reference template is collated with its corresponding check object, the CPU 4 prepares the collation templates based on the reference template. In a third embodiment of the invention, collation templates used for collation with a check object are previously entered in a template memory 5.

In the embodiment, a large-capacity memory is required as the template memory 5, but the time required for preparing the collation templates is not needed and the collation templates are read from the template memory 5 in sequence and are collated with the check object, so that a CPU having comparatively slow processing speed can be used as a CPU 4. Other components and operation of the third embodiment are similar to those of the first embodiment.

4th Embodiment

Figure 4:
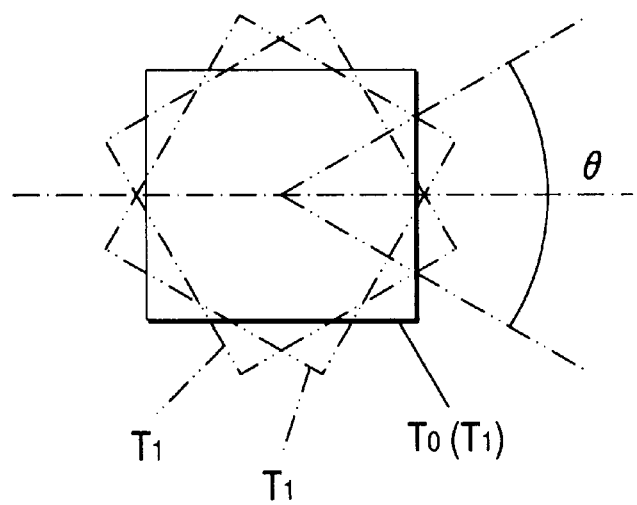
FIG. 4 is a conceptual illustration of a fourth embodiment of the invention.

In a fourth embodiment of the invention, an angle range θ for preparing collation templates T1 is limited, as shown in FIG. 4. That is, if collation templates T1 at all angles are prepared for such an object 1 where only a comparatively small angle shift occurs, some collation templates T1 are not used. Thus, work templates T1 are prepared only in the necessary angle range θ.

The angle range θ of the collation templates T1 to be prepared is thus limited, whereby the number of the collation templates T1 to be used can be decreased, so that the processing time required for preparing the collation templates T1 is shortened and the memory capacity of a template memory 5 for storing the collation templates T1 for one check object lessens. If the same processing time and the same memory capacity are applied, the angle intervals of the collation templates T1 can be narrowed for raising the detection accuracy of the rotation angle of a check object. The angle range θ is set by the user through an operation section, such as a keyboard, not shown. Other components and operation of the fourth embodiment are similar to those of the first to third embodiments.

5th Embodiment

Figure 5:
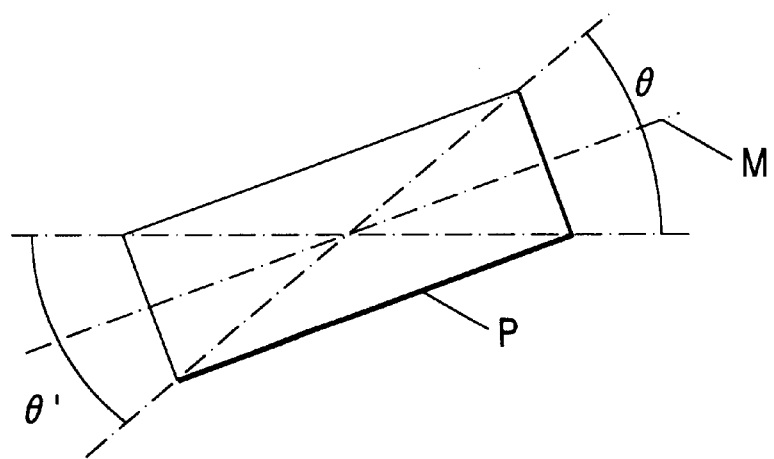
FIG. 5 is a conceptual illustration of a fifth embodiment of the invention.
Figure 6:
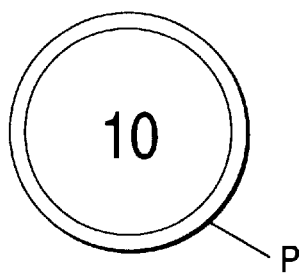
FIGS. 6(a) and 6(b) are illustrations to explain a conventional problem.
Figure 6:
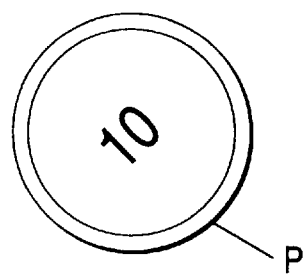
Figure 7:
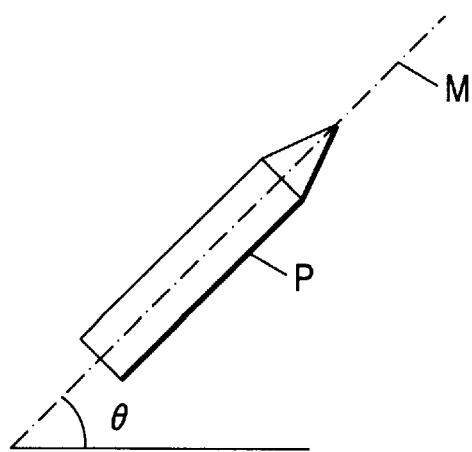
FIGS. 7(a) and 7(b) are illustrations to explain a conventional problem.
Figure 7:
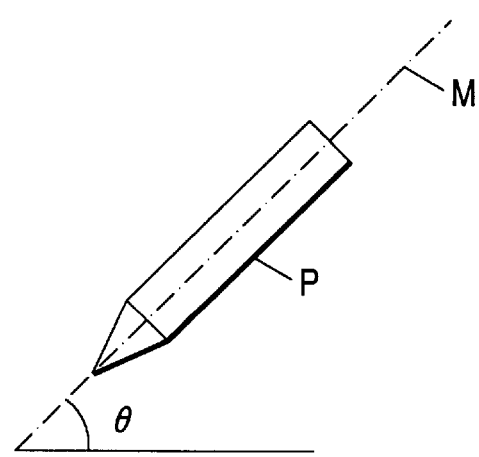

A fifth embodiment of the invention uses both the method of the fourth embodiment and the conventional art for finding a main axis. That is, as shown in FIG. 5, the conventional art is applied for finding a main axis M of a check object P and an angle range θ is set with the rotation angle of the main axis M as the center. Further, another angle range θ' different 180° from the angle range θ is set and collation templates in the angle ranges θ and θ' are collated with the check object P. To find the main axis M, a binary image provided by binarizing an original image with respect to the concentration with an appropriate threshold value is used and a conventional known technique is applied.

The technique of the embodiment enables detection of the rotation angle of even a check object P symmetric with respect to a line, the rotation angle of the check object P being unable to be detected if the rotation angle of the main axis M is only found as in the conventional art. Other components and operation of the fifth embodiment are similar to those of the first to third embodiments.

6th Embodiment

Figure 8:
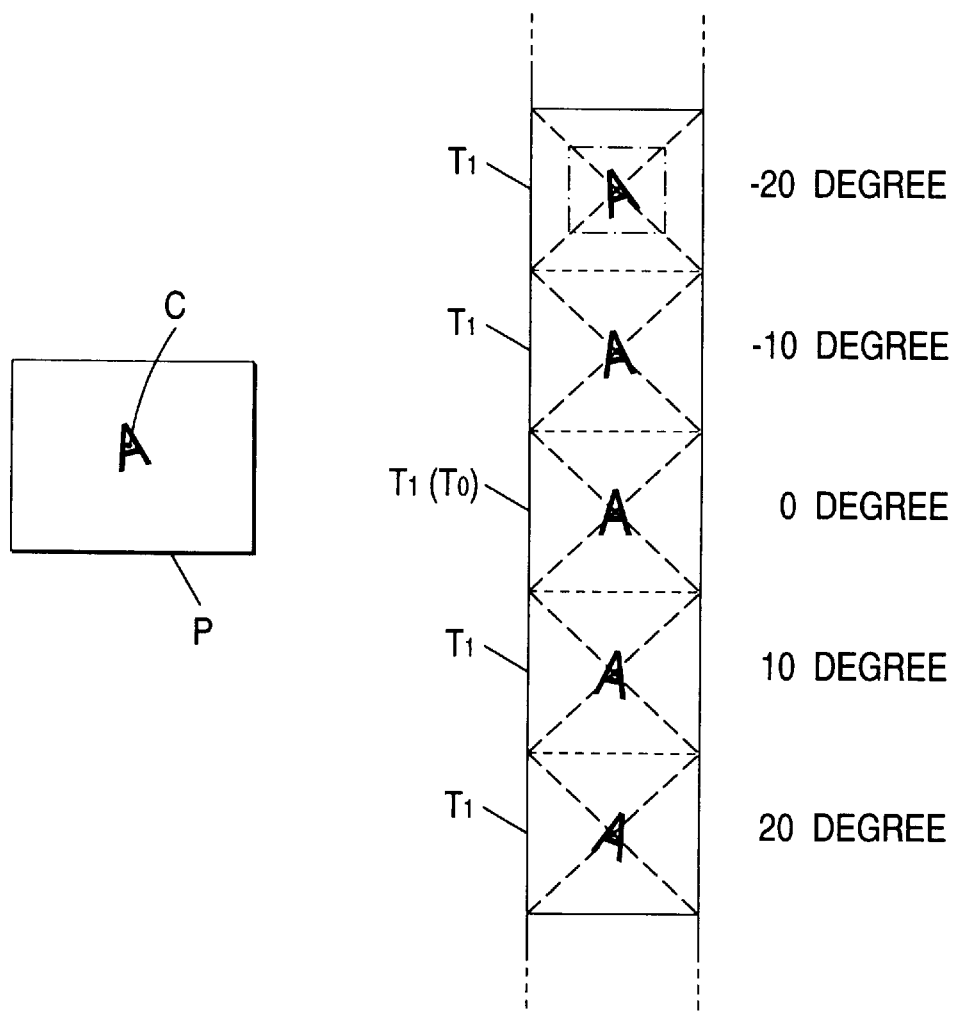
FIG. 8 is a conceptual illustration of a sixth embodiment of the invention.

As shown in FIG. 8, in a sixth embodiment of the invention, a representative point C of a check object (generally, center of gravity) is defined and the center of each collation template is matched with the center of the check object for collating the collation templates with the check object. The collation templates are provided for one round. This means that collation is executed in the range of 0–360 degrees; the rotation angle of even a check object with a main axis hard to set such as a check object with the outline as a circle or a square can be detected. However, a plain circle contains no orientation and a plain square is 4-revolution rotation symmetry and the rotation angles are equivalent with respect to four directions, in which cases the rotation angle cannot be determined even in the embodiment. However, if a character or a mark is written within the outline of a check object, the technique of the embodiment can be applied for finding the rotation angle. Other components and operation of the sixth embodiment are similar to those of the first to third embodiments.

7th Embodiment

A seventh embodiment of the invention will be discussed with reference to FIGS. 9 to 15.

A position detection system of the seventh embodiment comprises a TV camera 10, a monitor 11, a memory 12, capture memories 13A and 13B, display memories 14A and 14B, an overlay memory 15, an LUT (look-up table) 16, a CPU (central processing unit) 17, an ASIC (application-specific IC) 18, and a scan memory (not shown).

The TV camera 10 together with the monitor 11 picks up an image of a check object. The memory 12 stores a correct solution image containing the check object. A changeover switch SW1 switches between access of the CPU 17 to the memory 12 and access of the ASIC 18 to the memory 8 to prevent the ASIC 18 and the CPU 17 from accessing the memory 12 at the same time.

The capture memory 13A, 13B reads the check image (input image) in the check range in which the check object exists from the TV camera 10 and records the check image. Changeover switches SW2a and SW2b switch among access of the CPU 17 to the capture memory 13A, 13B, access of the ASIC 18 to the capture memory 13A, 13B, and connection to the TV 1. Thus, when one of the capture memories 13A and 13B is connected to either the CPU 17 or the ASIC 18, the other is connected to the TV camera 10. Therefore, when one of the capture memories 13A and 13B is processed by either the CPU 17 or the ASIC 18, the other is connected to the TV camera 10 for reading another check image.

The display memory 14A, 14B records an image displayed on the monitor 11. Changeover switches SW3a and SW3b switch among access of the CPU 17 to the display memory 14A, 14B, connection to the TV 1 for reading a check image, and connection to the monitor 11 for displaying the check image.

The overlay memory 15 draws a character or a graphic form, superimposes it on a check image, and displays the resultant image on the monitor 11. The LUT 16 has a table for determining an output value to the monitor 11.

The CPU 17 executes general-purpose calculation. It performs calculation of all processing other than calculation processed by the ASIC 18.

The ASIC (calculation means) 9 is suitable for repeating multiplication and addition of simple calculation. It is dedicated to execution of arithmetic of sum of products ($\Sigma xy$) of aim calculation. The arithmetic of sum of products becomes sum total calculation when x=1; the arithmetic becomes calculation of sum of products in the narrow sense when x≠y; the arithmetic becomes calculation of sum of squares when x=y. The operation of the ASIC 18 and expressions of arithmetic of sum of products will be discussed later in detail.

The scan memory stores scan data for actually operating the ASIC 18; the scan memory, the memory 12, and the capture memories 13A and 13B make up a memory section. The scan data is prepared by the CPU 17.

Next, the operation of the ASIC 18 will be discussed in detail. First, the CPU 17 selects the ASIC 18 and transfers scan data to the ASIC 18, which then selects a memory and a write mode, whereby the memory section writes the scan data into the scan memory. When a checker (not shown) is started, the CPU 17 causes the ASIC 18 to select a memory and generate a scan memory read address, whereby the memory section reads data from the scan memory. In response to the data read, the ASIC 18 checks the number of data pieces, sets a mode and various parameters, and generates scan data. It also reads data from the capture memory 13A, 13B of video memory and the memory 12. The ASIC 18 counts gray-scale data, namely, performs arithmetic of sum of products, calculation of sum total, sum of products in a narrow sense, or sum of squares, based on set mode selection, and requests the CPU 17 to read the arithmetic result of sum of products. The CPU 17 makes timing adjustment and reads the arithmetic result of sum of products.

Figure 9:
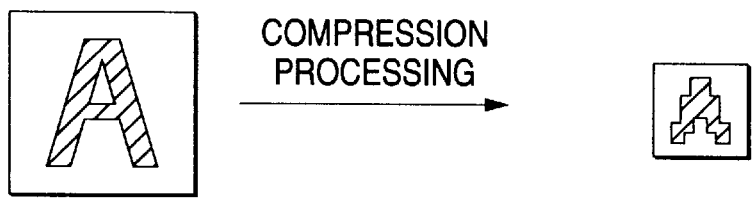
FIG. 9 is an illustration to show compression processing according to a seventh embodiment of the invention.
Figure 10:
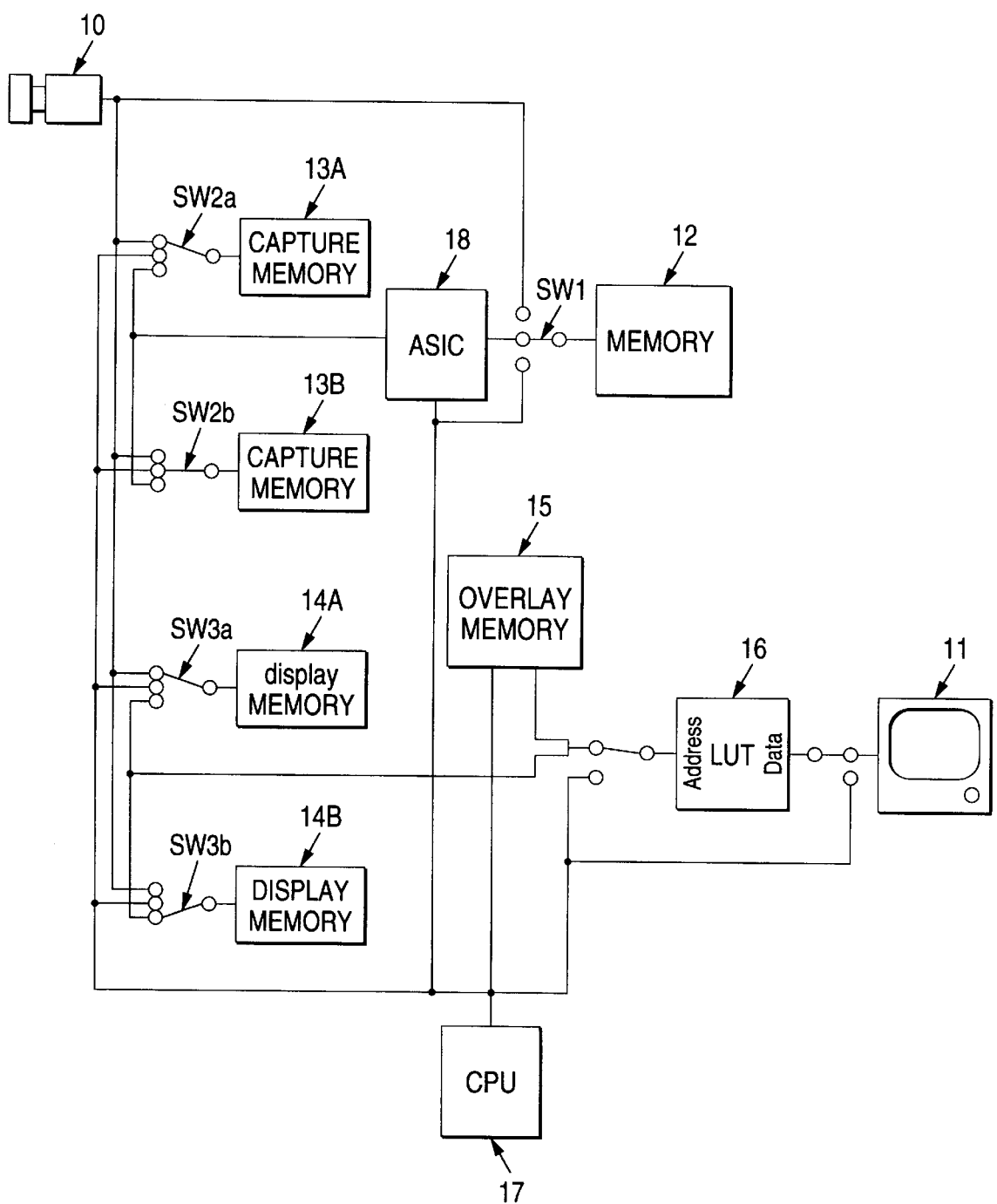
FIG. 10 is a block diagram to show the configuration of the seventh embodiment of the invention.
Figure 11:
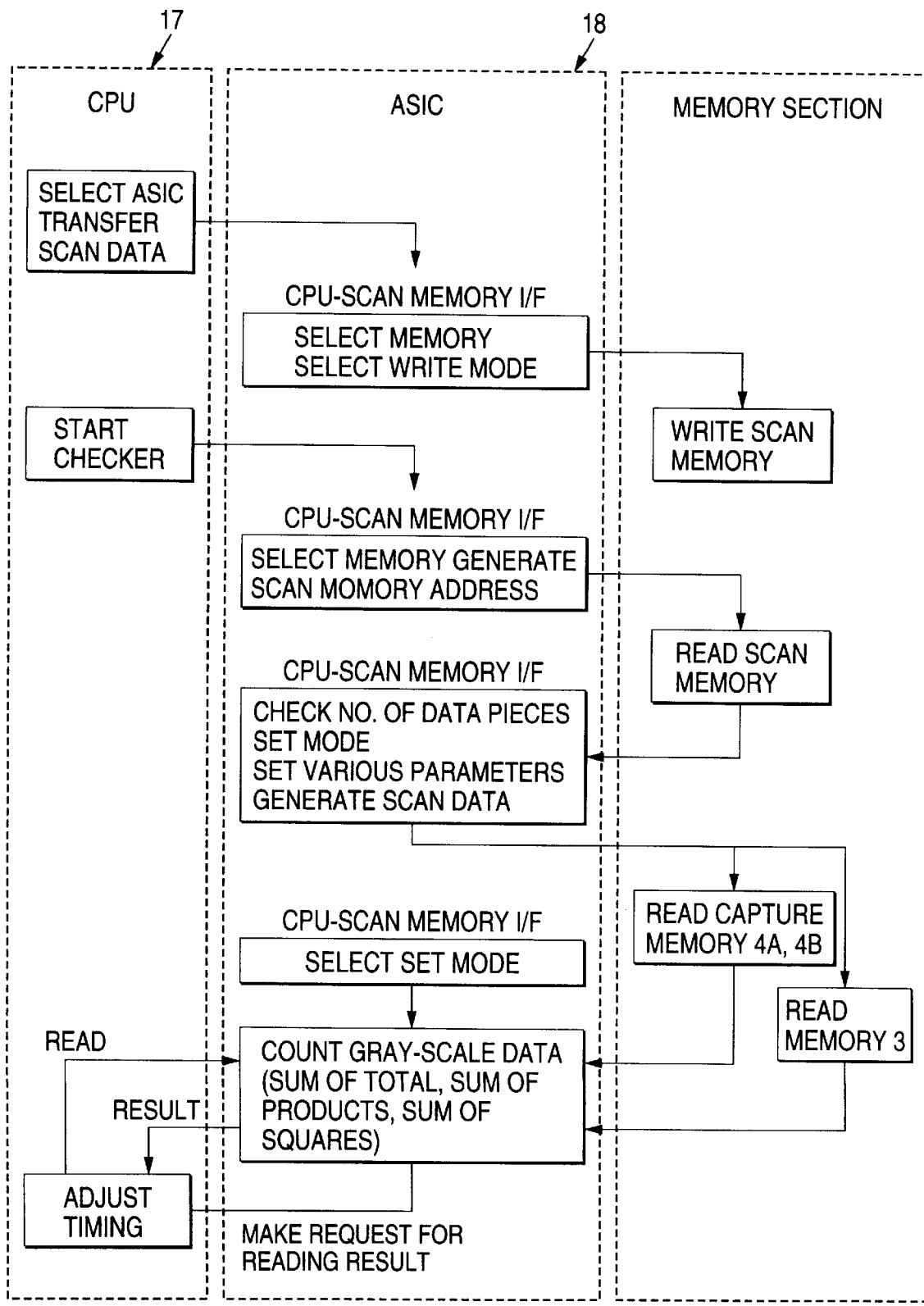
FIG. 11 is an illustration to show the operation of a CPU, an ASIC, etc., in the seventh embodiment of the invention.

Next, the general operation of the position detection system will be discussed. The position detection system performs rough detection processing of detecting a rough position of an approximate position of a check object in a check range based on the comparison result of comparison processing of comparing images provided by compressing a correct solution image containing the check object subjected to the detection displacement operation of displacing by rough detection displacement amount at a time in the check image and the check image as shown in FIG. 9, then performs precise detection processing of more precisely detecting the position of the check object in the check range in the proximity of the rough position based on the comparison result of comparison processing of comparing the images provided by compressing the correct solution image subjected to the detection displacement operation of displacing by rough detection displacement amount at a time in the check image and the check image at a compression rate more moderate than the previous compression rate, and detects the position of the check object in the check range in multiple steps, wherein the compression rate is moderated from 1/16 to 1/8 to 1/4 to 1/2 to 1/1 (five steps) in X and Y directions. That is, the compression rate 1/1 is a last step. The compression processing refers to average compression processing of calculating an average value of brightness in a square area and adopting the calculation result as the brightness of one pixel of the compressed image. For example, if the compression rate is 1/16, an average value of the brightness in a 16×16 pixel area becomes the brightness of one pixel of the compressed image. Incidentally, the correct solution image corresponds to the reference template in the first embodiment. The correct solution image subjected to the detection displacement operation corresponds to the collation template in the first embodiment. A detection displacement angle θ described hereinafter corresponds to the rotation angle in the first embodiment.

Figure 12:
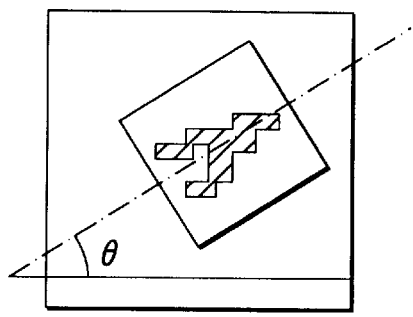
FIG. 12 is an illustration to show the displacement operation of rotation of a reference image compressed in the seventh embodiment of the invention.
Figure 15:
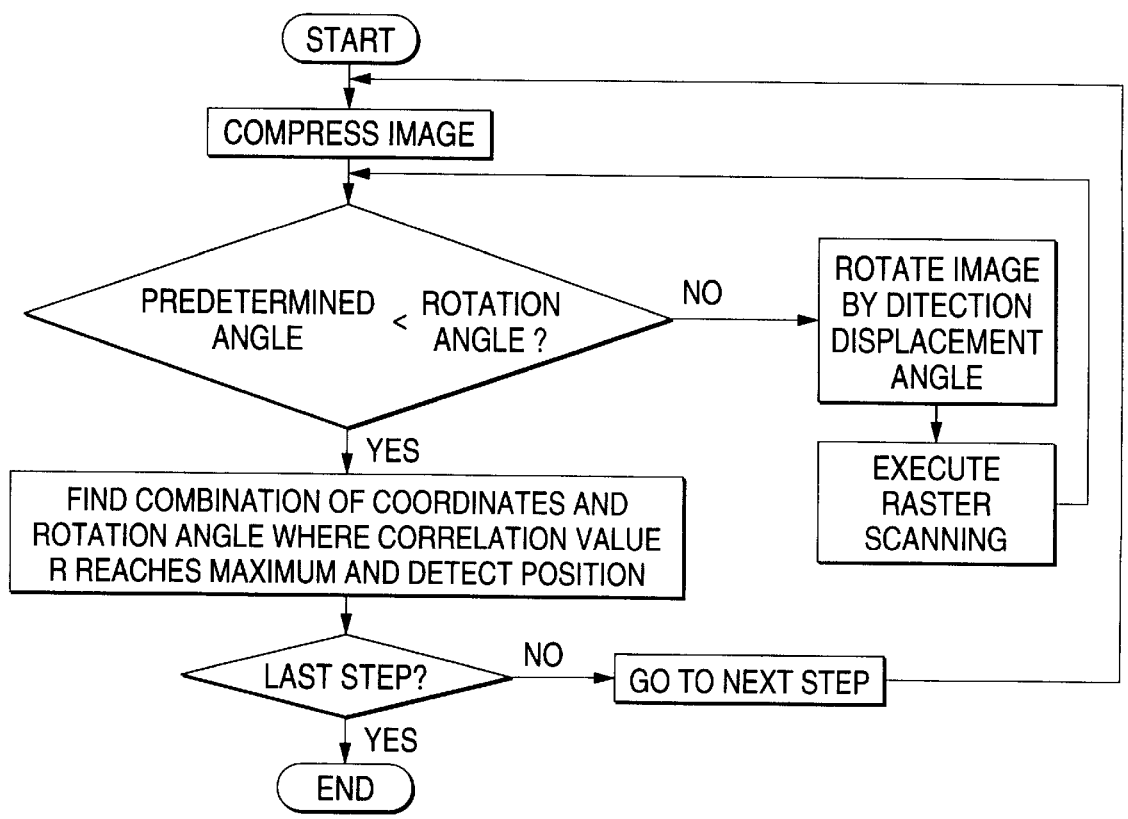
FIG. 15 is a flowchart to show the detection operation of the seventh embodiment of the invention.

Next, the operation of the position detection system will be discussed in detail with reference to FIG. 15. First, a check image and a correct solution image are compressed at the above-mentioned compression rate. Then, as shown in FIG. 12, the compressed correct solution image is rotated by detection displacement angle (detection displacement amount) θ as one displacement operation and is moved in parallel by detection displacement length of one pixel of the compressed image (detection displacement amount) at a time in a predetermined range as one displacement operation. This is so-called raster scanning. The displacement operation comprising the rotation and parallel move is performed until the rotation angle becomes a predetermined angle θ.

The predetermined angle θ in the first-step detection processing is 360°, for example. The detection displacement angle θ is found according to expression (1) for calculating an angle when the pixel at the position most distant from the rotation center is displaced one pixel. In expression (1), Dist denotes the distance between the rotation center and the pixel at the position most distant from the rotation center. The Dist, which is the distance between the rotation center and the pixel at the position most distant from the rotation center, increases gradually as the compression rate is moderated. Therefore, the detection displacement angle θ lessens gradually as the compression rate is moderated. This means that the precise detection displacement angle used for the precise detection processing becomes smaller than the rough detection displacement angle used for the rough detection processing.

Detection displacement angle θ=Sin$^{-1}$–(1/Dist)  (1)

On the other hand, the predetermined range in the first-step detection processing is all the area of the compressed image. The detection displacement length, which is one pixel of the compressed image as described above, lessens gradually as the compression rate is moderated. This means that the precise detection displacement length used for the precise detection processing becomes smaller than the rough detection displacement length used for the rough detection processing.

Figure 13:
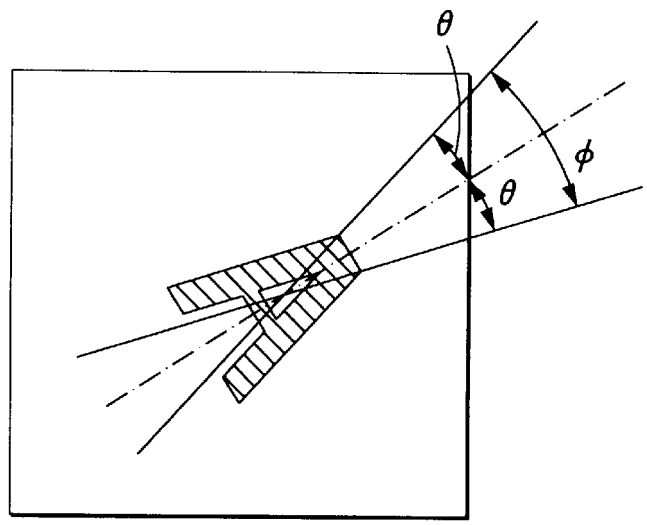
FIG. 13 is an illustration to show a predetermined angle of rotation in the next step in the seventh embodiment of the invention.

After the first-step detection processing is thus performed, the next-step detection processing is performed. The predetermined angle φ in the next-step or later-step detection processing is between the angle to which the detection displacement angle θ in the previous step is added and the angle from which the detection displacement angle θ in the previous step is subtracted with the angle where the rough position (rough rotation angle) of the check object is detected as the center, as shown in FIG. 13. FIG. 13 is an illustration to explain the predetermined angle φ and compression processing is not performed.

Figure 14:
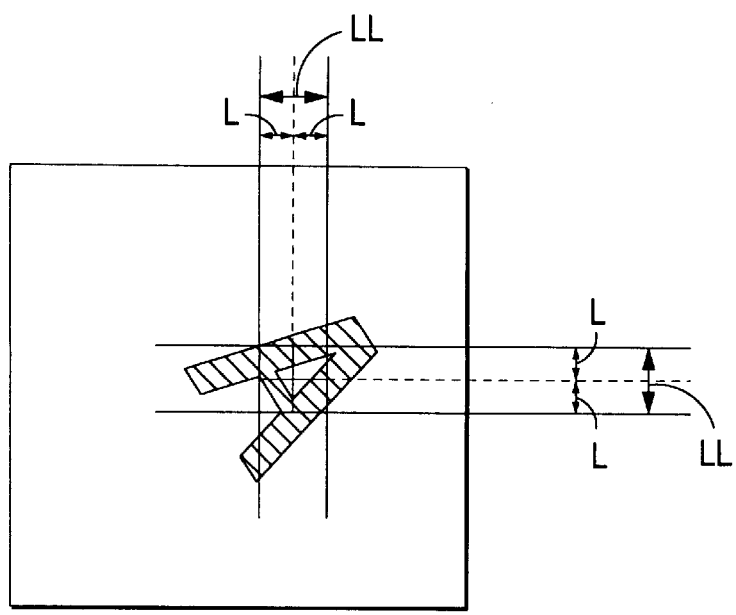
FIG. 14 is an illustration to show a predetermined range of parallel move in the next step in the seventh embodiment of the invention.

A predetermined dimension LL for defining the predetermined range in the next-step detection processing is between the position (coordinate) to which dimension value L resulting from (current compression rate in the next step)/ (previous compression rate) is added and the position (coordinate) from which the dimension value L is subtracted with the rough position (rough coordinate) where the approximate position (coordinate) of the check object is detected as the center in X and Y directions as shown in FIG. 14. For example, if the previous compression rate is 1/16 and the compression rate in the next step is 1/8, the dimension value L becomes 2 and the predetermined dimension LL in the next-step detection processing becomes the range of ±two pixels with the position (coordinate) detected in the previous step as the center. FIG. 14 is an illustration to explain the predetermined dimension LL and compression processing is not performed.

After the displacement operation is performed, correlation value R indicating the match degree between the correct solution image and the check image in the area where the correct solution image and the check image are superimposed is calculated according to expression (2) involving arithmetic of sum of products, the correlation values are compared and a combination of the coordinate and the rotation angle where the correlation value R reaches the maximum is found, thereby detecting the position of the check object in the detection check range.

In expression (2), f (x, y) denotes the brightness value of the correct solution image in the coordinates (x, y), g (x, y) denotes the brightness value of the check image in the coordinates (x, y), S denotes the area where the correct solution image and the check image are superimposed, and mn denotes the number of pixels in the superimposed area. Correlation value R=

$$\sqrt{\frac{\left\{mn\sum_{x,y\in s}+(x,y)g(x,y)-\sum_{x,y\in s}+(x,y)\sum_{x,y\in s}g(x,y)\right\}^2}{\left(mn\sum_{x,y\in s}+(x,y)^2-\left(\sum_{x,y\in s}+(x,y)\right)^2\right)\left(mn\sum_{x,y\in s}g(x,y)^2-\left(\sum_{x,y\in s}g(x,y)\right)^2\right)}} \quad (2)$$

If the position of the check object in the detection check range is detected according to the procedure, for example, when the sizes of the check image and the correct solution image are 512×480 pixels and 128×128 pixels respectively and the detection displacement angle θ in the last step is 1°, the total number of calculation processing times accompanying the detection processing becomes 19300 and the total processing time becomes about one second. Thus, the number of detection processing times and the detection time are drastically decreased as compared with the total number of calculation processing times, 48000000 and the total processing time, several seconds applied when the position of the check object in the detection check range is detected by 1-step detection without executing multi-step detection. About 98% of the number of processing times 19300 is the number of processing times in the first-step detection processing.

In the position detection system, unlike the image provided by extracting (or thinning out) some of the pixels making up the correct solution image, the image provided by the average compression processing has an average of values of pixels. Thus, if some pixels have peculiar values, the peculiar values are averaged and the peculiar values themselves are excluded, so that the position of the check object in the check range can be detected accurately.

By displacing by precise detection displacement amount smaller than the rough detection displacement amount at a time, more precise detection processing can be performed than detection processing of displacing by the same precise detection displacement amount as the rough detection displacement amount at a time. The effect of being capable of accurately detecting the position of the check object in the check range can be produced furthermore.

Since the arithmetic of sum of products is performed by the ASIC 18 dedicated to execution of aim calculation and not by the CPU 17 used for general-purpose calculation, the time required for the arithmetic of sum of products can be made shorter than that taken when the CPU 17 performs the arithmetic of sum of products. For example, when the sizes of the check image and the correct solution image are 512×480 pixels and 128×128 pixels respectively, if only the CPU 17 executes the arithmetic of sum of products, it takes several seconds in processing; the time is shortened to about one second in the embodiment.

8th Embodiment

Next, an eighth embodiment of the invention will be discussed with reference to FIG. 16. Parts identical with those previously described in the seventh embodiment are denoted by the same reference numerals in the eighth embodiment and will not be discussed again. In the seventh embodiment, when detection processing in each step is performed, the coordinates and the rotation angle with the correlation value R reaching the maximum are found, thereby detecting the position of the check object; in the eighth embodiment, when detection processing in each step other than the last step is performed, a plurality of proposed combinations of the coordinate and the rotation angle where the correlation value R is relatively high and exceeds a threshold value are found, then when detection processing in the next step is performed, the combinations found in the previous step are narrowed down and the position of the check object is detected.

Figure 16:
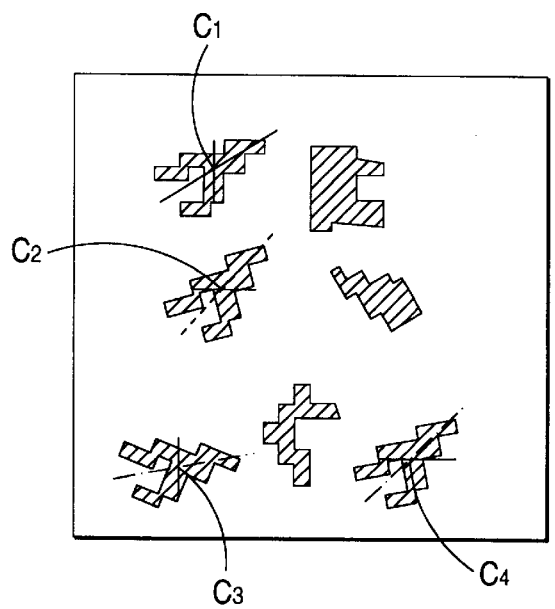
FIG. 16 is an illustration to show a plurality of positions detected by performing first-step detection processing in an eighth embodiment of the invention.
Figure 17:
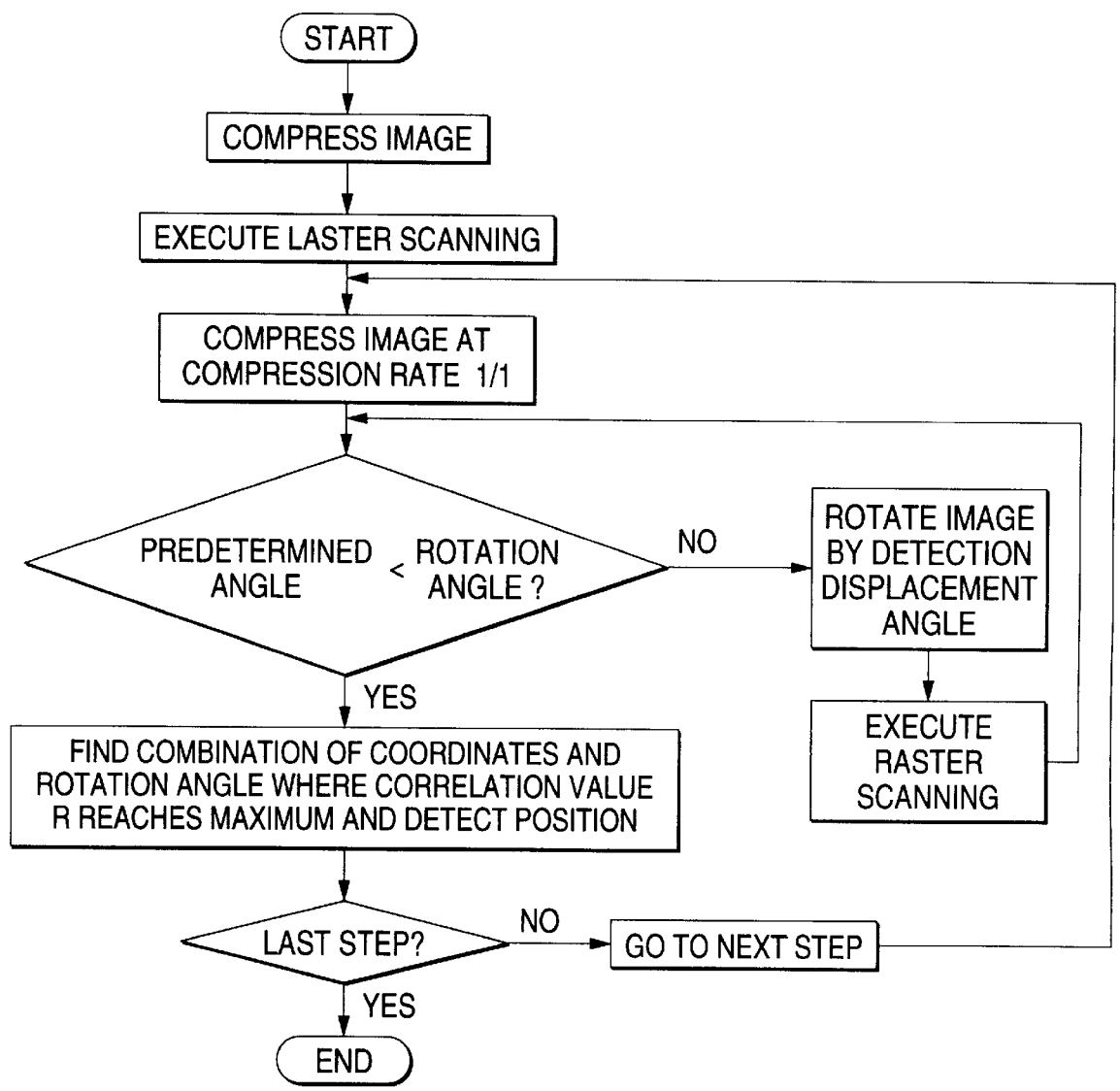
FIG. 17 is a flowchart to show the detection operation of a ninth embodiment of the invention.

More particularly, for example, as shown in FIG. 16, when first-step detection processing is performed, if there are first-order to seventh-order combinations of coordinates and rotation angle with the correlation value R being not much low, the first-order to fifth-order combinations with the correlation value R being comparatively high are selected and when the first-order to the fourth-order combinations have the correlation value R exceeding a threshold value, only the first-order to the fourth-order combinations, namely, C1, C2, C3, and C4 are found, thereby detecting more than one position of the check object. When second-step detection processing is performed, a predetermined range and detection displacement length L for a parallel move of one displacement operation and a predetermined angle $\phi$ and detection displacement angle $\theta$ for rotation of one displacement operation are calculated based on each of the first-order to fourth-order detection positions. Then, the second-step detection processing is performed.

In the position detection system, if an only position is detected in the previous-step detection processing, the detected position may be detected with poor accuracy and have an error because of noise, etc. However, if a number of positions are detected in the previous-step detection processing and then are also narrowed down in the next-step detection processing, even if the detected positions contain a position not accurately detected and having an error, the position can be excluded when the detected positions are narrowed down. Thus, the effect of being capable of accurately detecting the position of the check object in the check range can be produced furthermore.

As in the seventh embodiment, by displacing by precise detection displacement amount smaller than the rough detection displacement amount at a time, the effect of being capable of accurately detecting the position of the check object in the check range can be produced furthermore.

As in the seventh embodiment, the arithmetic of sum of products is performed by an ASIC 18 dedicated to execution of aim calculation, so that the time required for the arithmetic of sum of products can be made shorter than that taken when the arithmetic of sum of products is performed by a CPU 17.

9th Embodiment

Next, a ninth embodiment of the invention will be discussed with reference to FIG. 9. Parts identical with those previously described in the seventh embodiment are denoted by the same reference numerals in the ninth embodiment and will not be discussed again. In the seventh embodiment, when the first-step detection processing is performed, the displacement operation of parallel move and rotation is performed; in the ninth embodiment, the displacement operation of only parallel move is performed.

More particularly, in the first-step detection processing, for example, a check image and a correct solution image are compressed at a compression rate of 1/4, then the compressed correct solution image is moved in parallel as the displacement operation by detection displacement length of one pixel of the compressed image at a time in a predetermined range, namely, in all the area of the compressed image.

After the first-step detection processing is thus performed, the second-step detection processing involving the displacement operation of parallel move and rotation is performed.

The compression rate in the second step and later is 1/1. A predetermined range in the second step and later is between the position (coordinate) to which dimension value L resulting from (current compression rate in the next-step)/ (previous compression rate) is added and the position (coordinate) from which the dimension value L is subtracted with the position (coordinate) where the approximate position (coordinate) of the check object is detected as the center. For example, if the compression rate in the previous-step detection processing is 1/4 and the current compression rate for the next-step detection processing is 1/1, the dimension value L becomes 4 and the predetermined range in the next-step detection processing becomes the range of ±four pixels with the position (coordinate) detected in the previous step as the center. The detection displacement length in the second step and later 1/(2×previous compression rate). For example, if the previous compression rate is 1/4 and the current compression rate is 1/1, the detection displacement length becomes two pixels. On the other hand, the detection displacement length in the first-step detection processing is one pixel of the image compressed at the compression rate 1/4 and corresponds to four pixels of the uncompressed image, thus the detection displacement length in the second-step detection processing is smaller than the detection displacement length in the first-step detection processing. When the detection displacement length becomes less than one pixel, the predetermined range and the detection displacement length are not changed as the detection step proceeds.

On the other hand, a predetermined angle in the second step, $\phi$, is ±16°, for example. A predetermined angle in the third step and later, $\phi$, is ±(1/previous compression rate). For example, if the previous compression rate is 1/4 and the current compression rate is 1/1, the predetermined angle $\phi$ becomes ±4°. The predetermined angle in the third step and later, $\phi$, which is ±(1/previous compression rate), lessens as the detection step proceeds when the compression rate is smaller than 1/1. A detection displacement angle $\theta$ is 1/4 of the predetermined angle $\phi$. For example, if the predetermined angle $\phi$ is ±16°, the detection displacement angle $\theta$ becomes 8°. The detection displacement angle $\theta$, which is 1/4 of the predetermined angle $\phi$, lessens as the detection step proceeds when the predetermined angle lessens as the detection step proceeds as described above. When the detection displacement angle $\theta$ exceeds the limit accuracy, the predetermined range and the detection displacement length are not changed as the detection step proceeds.

In the above position detection system, the first-step detection processing of rough detection processing of detecting an approximate position involves a wide detection range and a large calculation amount for the detection processing as compared with the second-step detection processing of precise detection processing of detecting a more precise position in the proximity of the rough position, thus takes time in processing. However, the first-step detection processing, which involves only the displacement operation of only parallel move, takes shorter time in processing than the detection processing involving the displacement operation comprising rotation and parallel move. Specifically, for example, when the sizes of the check image and the correct solution image are 512×480 pixels and 128×128 pixels respectively, the predetermined angle in the second-step detection processing, $\phi$, is ±16°, the compression rate in the first-step detection processing is 1/4, and the angle limit accuracy is 1°, the total number of calculation processing times associated with the detection processing becomes 880 and the detection processing time becomes 400 msec.

As in the seventh embodiment, by displacing by precise detection displacement amount smaller than the rough detection displacement amount at a time, the effect of being capable of accurately detecting the position of the check object in the check range can be produced furthermore.

As in the seventh embodiment, the arithmetic of sum of products is performed by an ASIC 18 dedicated to execution of aim calculation, so that the time required for the arithmetic of sum of products can be made shorter than that taken when the arithmetic of sum of products is performed by a CPU 17.

10th Embodiment

Figure 18:
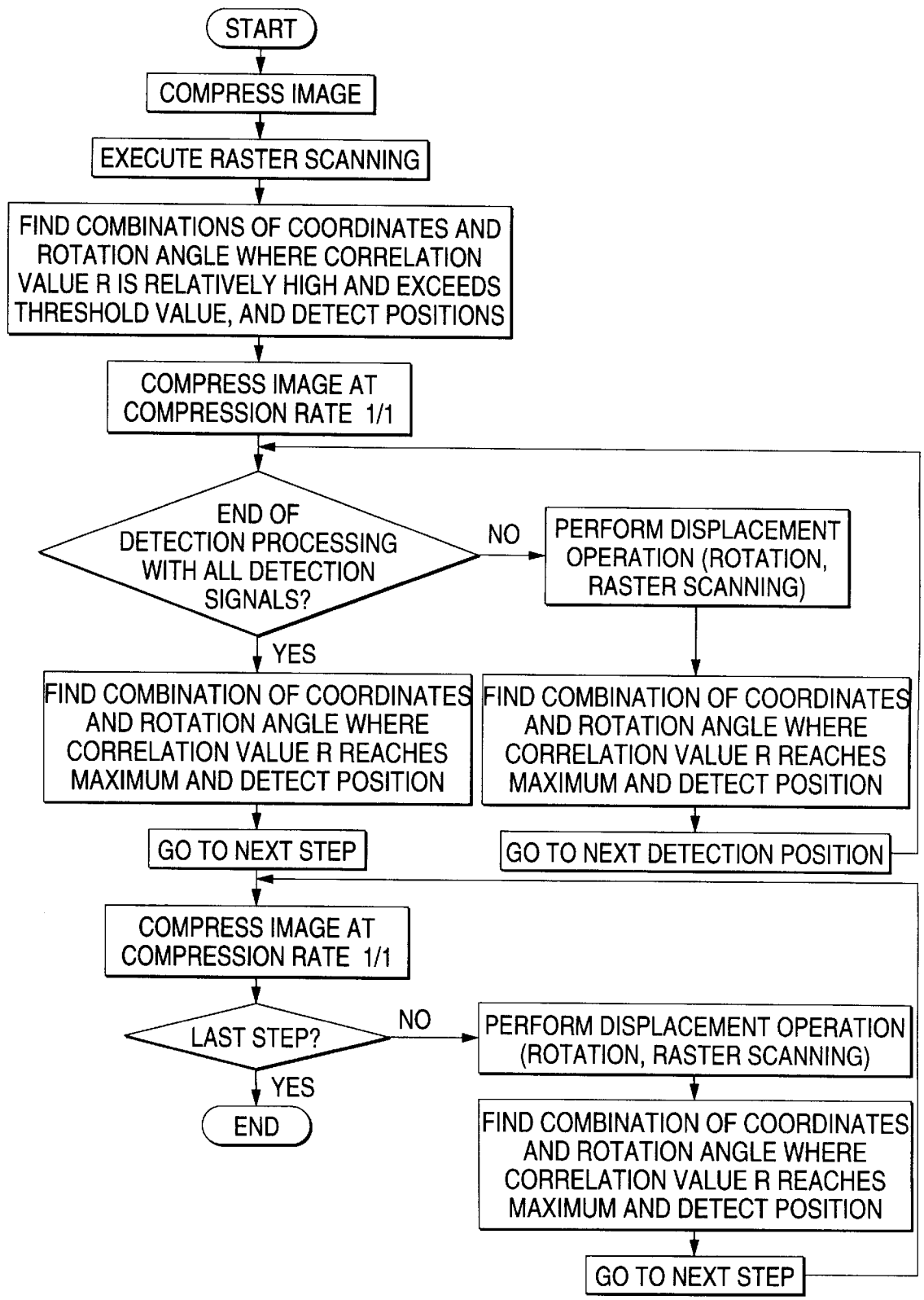
FIG. 18 is a flowchart to show the detection operation of a tenth embodiment of the invention.

Next, a tenth embodiment of the invention will be discussed with reference to FIG. 18. Parts identical with those previously described in the ninth embodiment are denoted by the same reference numerals in the tenth embodiment and will not be discussed again. In the ninth embodiment, when the second-step detection processing is performed, the coordinates and the rotation angle with the correlation value R reaching the maximum are found, thereby detecting the position of the check object; in the tenth embodiment, as in the first-step to fourth-step detection processing in the eighth embodiment, a plurality of combinations of the coordinates and the rotation angle where the correlation value R is relatively high and exceeds a threshold value are found, then when third-step detection processing is performed, the combinations found in the second-step detection processing are narrowed down and the position of the check object is detected.

In the position detection system, even if the detected positions contain a position not accurately detected and having an error, the position can be excluded when the detected positions are narrowed down, thus the effect of being capable of accurately detecting the position of the check object in the check range can be produced furthermore as in the eighth embodiment in addition to the effect of the ninth embodiment.

11th Embodiment

Figure 19:
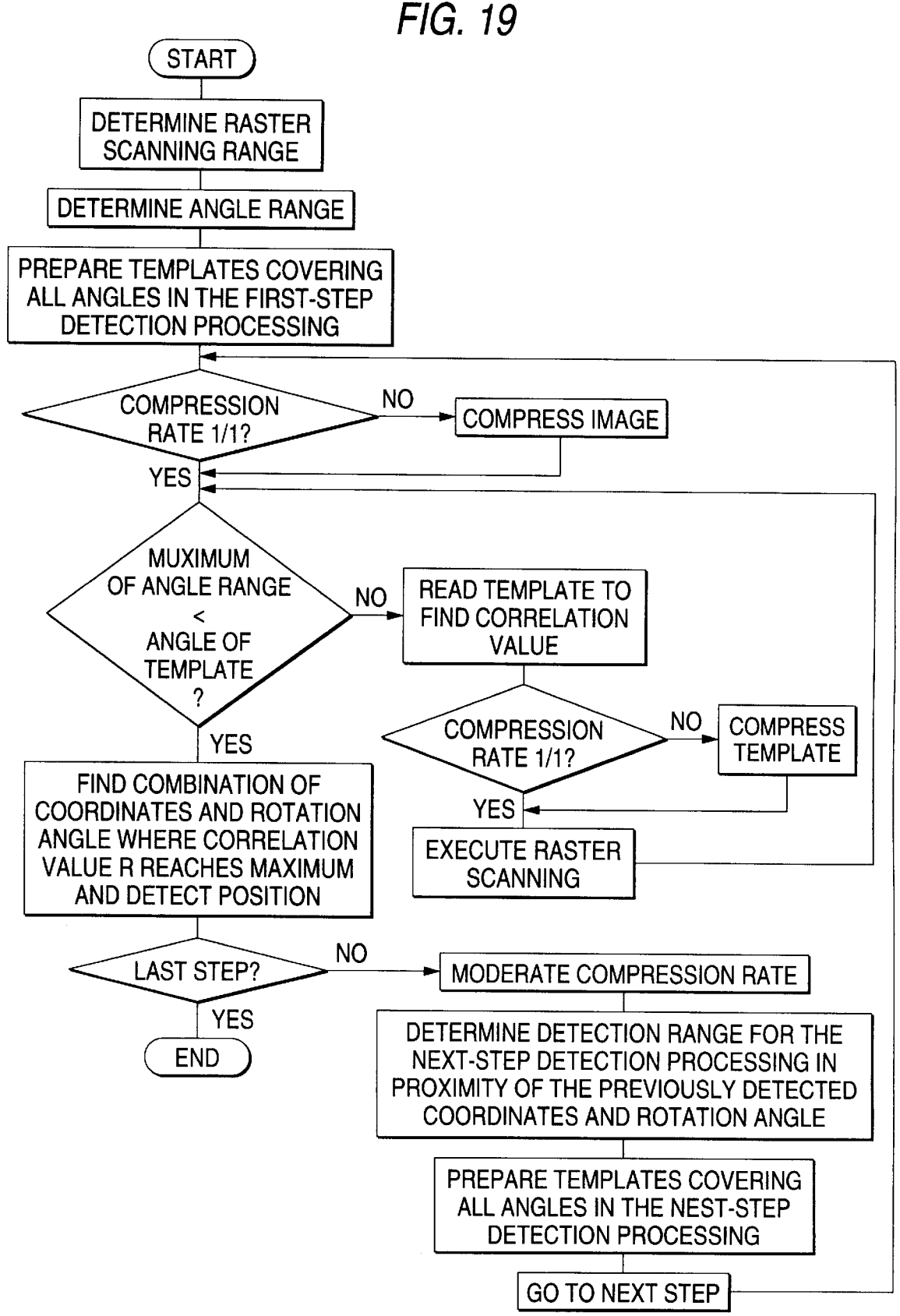
FIG. 19 is a flowchart to show the detection operation of an eleventh embodiment of the invention.

Next, an eleventh embodiment of the invention will be discussed with reference to FIG. 19. This embodiment is a combination which includes steps for preparing templates and steps for compressing the check image and the templates.

In this embodiment, the check ranges of the raster scanning and the rotation angle to be detected are limited in a predetermined range in advance, as described in the fourth to sixth embodiments. In the first-step detection processing, the compressed check image (compressed input image) and the compressed collation templates (the compressed correct solution image subjected to the detection displacement operation) are compared so as to detect a rough position (rough coordinate and rotation angle) of the check object where the correlation value reaches maximum in the first-step detection processing. In the next step, the compression rate is moderated, and the check image and the collation templates at a compression rate more moderate than the previous compression rate are compared in the proximity of the rough position detected in the first-step detection processing so as to detect the position of the check object more precisely. By performing the aforementioned rough detection processing in multiple steps, it is possible to determine the precise position of the check object. This embodiment is an example of a combination of first, fourth to seventh embodiments aforementioned. Of course, it is possible to adopt various combinations of the aforementioned embodiments.

In the above embodiments, the detection displacement angle θ may lessen as the detection step proceeds; for example, when the detection displacement angle θ is extremely small, it need not necessarily be lessened as the detection step proceeds.

The procedure of lessening the detection displacement length and the detection displacement angle θ as the detection step proceeds is not limited to the procedures shown in the above embodiments.

In the above embodiments, the arithmetic of sum of products is performed by the ASIC 18 dedicated to execution of aim calculation; for example, when the check image is small and the detection processing calculation amount is not much large, the arithmetic of sum of products may be performed by the CPU 17.

According to the invention, a position detection method comprises a first step of preparing a plurality of collation templates one after another by rotating a reference template as a reference graphic form previously entered at various rotation angles, a second step of collating the collation templates with a check object contained in a given input image in order for evaluating a correlation degree therebetween, and a third step of acknowledging the rotation angle which the collation template most matching the check object at the second step forms with the reference template as the rotation angle of the check object. The collation templates provided by rotating the reference template at various rotation angles are collated with the check object, thereby finding the rotation angle of the check object. Thus, even if the outline of the check object is a shape having symmetry, if the check object contains orientation, the rotation angle of the check object can be detected. Moreover, the collation templates are prepared based on the reference template at the collation time with the check object, so that the capacity of the memory for entering the reference template becomes comparatively small.

If collation templates prepared one after another by a template preparation section having hardware dedicated to preparation of collation templates based on the reference template are used and the rotation angle of the check object is found by a collation operation section provided apart from the template preparation section from the collation results of the collation templates with the check object, the dedicated hardware is used for the step of preparing the collation templates based on the reference template, so that the step of preparing the collation templates from the reference template can be speeded up, leading to shortening of the processing time.

Further the position detection method may be provided which comprises a first step of collating a plurality of previously entered collation templates provided by rotating a reference graphic form at various rotation angles with a check object contained in a given input image in order for evaluating a correlation degree therebetween and a second step of acknowledging a rotation angle which the collation template most matching the check object at the first step forms with the reference template as the rotation angle of the check object. Since the collation templates are previously entered, the step of preparing the collation templates is not required at the collation time with the check object and high-speed processing is enabled.

If the angle range of the collation templates to be collated with the check object is limited to a predetermined range, assuming that the detection accuracy of the rotation angle is the same as that when the angle range is not limited, the number of collation templates can be decreased, resulting in speeding up of processing and a decrease in the memory capacity. If as many collation templates as the number of collation templates when the angle range is not limited are used, the detection accuracy of the rotation angle can be raised.

The position detection method preferably comprises the step of finding a rotation angle of a main axis of the check object, and if the angle range of the collation templates to be collated with the check object is limited to a predetermined angle range with the rotation angle of the main axis as the center and an angle range different 180 degrees from the predetermined angle range, the main axis of the check object is found, thereby finding a rough rotation angle of the check object, then the collation templates are used to determine the rotation angle of the check object. Thus, although the number of collation templates is reduced, the rotation angle of the check object can be found accurately.

The position detection method preferably comprises the step of finding a representative point becoming the rotation center of the check object, and if a representative point becoming the rotation center of each collation template is matched with the representative point of the check object for evaluating a correlation degree between the check object and the collation templates, the representative point becoming the rotation center of each collation template is matched with the representative point becoming the rotation center of the check object for collation. This eliminates the need for aligning each collation template and the check object each time the collation template is collated with the check object, facilitating the collation therebetween.

Further, in the present invention, unlike the image provided by extracting (or thinning out) some of the pixels making up the correct solution image, the image provided by the average compression processing has an average of values of pixels. Thus, if some pixels have peculiar values, the peculiar values are averaged and the peculiar values themselves are excluded, so that the position of the check object in the check range can be detected accurately.

If an only rough position is detected by performing the rough detection processing, the detected rough position may be detected with poor accuracy and have an error because of noise, etc. However, if a number of rough positions are detected in the rough detection processing and then are also narrowed down by performing the precise detection processing, even if the extracted rough positions contain a position not accurately detected and having an error, the position can be excluded when the rough positions are narrowed down. Thus, the effect of the invention aforementioned being capable of accurately detecting the position of the check object in the check range can be produced furthermore.

By displacing by precise detection displacement amount smaller than the rough detection displacement amount at a time, more precise detection processing can be performed than detection processing of displacing by the same precise detection displacement amount as the rough detection displacement amount at a time. The effect of the invention aforementioned being capable of accurately detecting the position of the check object in the check range can be produced furthermore.

In addition to the aforementioned effect of the invention, the rough detection processing of detecting an approximate position involves a wide detection range as compared with the precise detection processing of detecting a more precise position in the proximity of the rough position, thus takes time in processing. However, the first-step detection processing, which involves only the displacement operation of only parallel move, takes shorter time in processing than the detection processing involving the displacement operation comprising rotation and parallel move.

Further, the arithmetic of sum of products is performed by the addition means dedicated to execution of aim calculation and not by calculation means such as a CPU used for general-purpose calculation, thus the time required for the arithmetic of sum of products can be made shorter than that taken when the calculation means such as a CPU performs the arithmetic of sum of products.

What is claimed is:

1. A method for detecting a position of a check object using image processing, comprising the steps of:

picking up an image of the check object so as to prepare a check image of the check object;

smoothing said check image of the check object by removing noise associated with said check image;

preparing a reference template having a reference image of the check object;

preparing a plurality of collation templates by rotating the reference template at various rotation angles;

collating the collation templates with the check image so as to evaluate a correlation degree therebetween;

acknowledging a rotation angle of the reference template for preparing the collation template, which matches with the check image most exactly, as a rotation angle of the check object; and compressing the check image and the collation templates at a given compression rate by an average compression processing which calculates an average value of a brightness in a predetermined area and adopts the average value as a brightness of one pixel of the compressed check image and the collation templates, wherein said predetermined area comprises more than one pixel.

2. The method for detecting a position of a check object according to claim 1, wherein the step for preparing the collation templates is performed using a hardware dedicated to preparation of the collation templates and the collating step is performed using a collation operation section provided separate from the hardware.

3. The method for detecting a position of a check object according to claim 1, wherein the reference template and the collation templates are prepared before the picking-up step.

4. The method for detecting a position of a check object according to claim 1, further comprising the steps of limiting the rotation angle of the reference template for preparing the collation template to a predetermined range.

5. The method for detecting a position of a check object according to claim 1, further comprising the steps of:

finding a rotation angle of a main axis of the check object; and limiting the rotation angle of the reference template for preparing the collation template to a rotation angle range of the main axis as a center and an angle range different 180 degrees from the rotation angle range of the main axis.

6. The method for detecting a position of a check object according to claim 1, further comprising the steps of:

defining a representative point of the check object; and matching a center of the collation template with the representative point of the check object so as to evaluate the correlation degree between the check object and the collation templates.

7. The method for detecting a position of a check object according to claim 1, further comprising the steps of:

collating the compressed collation templates with the compressed check image so as to detect a rough rotation angle of the check object;

compressing the check image and the collation templates at a compression rate more moderate than the previous compression rate by the average compression processing after detecting the rough rotation angle;

displacing the compressed collation templates in a proximity of the rough rotation angle;

collating the compressed collation templates with the compressed check image so as to detect a more precise rotation angle than the rough rotation angle of the check object; and repeating all above steps while moderating the compression rate in multiple steps so as to detect the precise rotation angle of the check object.

8. A method for detecting a position of a check object using image processing, comprising the steps of:

(1) picking up an image of the check object so as to prepare a check image of the check object;

(2) preparing a correct solution image having a reference image of the check object;

(3) compressing the check image and the correct solution image at a given compression rate by an average compression processing which calculates an average value of a brightness in a predetermined area and adopts the average value as a brightness of one pixel of the compressed check image and the compressed correct solution image, wherein said predetermined area comprises more than one pixel;

(4) displacing the compressed correct solution image;

(5) comparing the compressed check image and the compressed/displaced correct solution image so as to detect a rough position of the check object;

(6) compressing the check image and the correct solution image after detecting the rough position at a compression rate more moderate than the previous compression rate by the average compression processing;

(7) displacing the compressed correct solution image in a proximity of the rough position;

(8) comparing the compressed check image and the compressed/displaced correct solution image so as to detect a more precise position than the rough position of the check object; and (9) repeating (3) to (8) steps while moderating the compression rate in multiple steps so as to detect the precise position of the check object.

9. The method for detecting a position of a check object according to claim 8, further comprising the steps of:

detecting a plurality of the rough positions in the step (5); and narrowing down the detected rough positions.

10. The method for detecting a position of a check object according to claim 8, wherein a displacement amount in the step (7) is smaller than a displacement amount in the step (4).

11. The method for detecting a position of a check object according to claim 8, wherein the step (4) includes a step of moving the compressed correct solution image according to a raster scanning, and the step (7) includes steps of moving the compressed correct solution image according to the raster scanning and rotating the compressed correct solution image.

12. The method for detecting a position of a check object according to claim 8, wherein the comparing steps includes arithmetic of sum of products executed by calculation means dedicated to execution of aim calculation.

13. A system for detecting a position of a check object using image processing, comprising:

means for picking up an image of the check object so as to prepare a check image of the check object;

means for smoothing said check image of the check object by removing noise associated with said image;

means for preparing a reference template having a reference image of the check object;

means for preparing a plurality of collation templates by rotating the reference template at various rotation angles;

means for collating the collation templates with the check image so as to evaluate a correlation degree therebetween;

means for acknowledging a rotation angle of the reference template for preparing the collation template, which matches with the check image most exactly, as a rotation angle of the check object, and means for compressing the check image and the collation templates at a given compression rate by an average compression processing which calculates an average value of a brightness in a predetermined area and adopts the average value as a brightness of one pixel of the compressed check image and the collation templates, wherein said predetermined area comprises more than one pixel.

14. The system for detecting a position of a check object according to claim 13, wherein said means for preparing the collation templates includes a hardware dedicated to preparation of the collation templates and said means for collating includes a collation operation section provided separate from said hardware.

15. The system for detecting a position of a check object according to claim 13, wherein the reference template and the collation templates are prepared before picking-up the image of the check object.

16. The system for detecting a position of a check object according to claim 13, further comprising means for limiting the rotation angle of the reference template for preparing the collation template to a predetermined range.

17. The system for detecting a position of a check object according to claim 13, further comprising:

means for finding a rotation angle of a main axis of the check object; and means for limiting the rotation angle of the reference template for preparing the collation template to a rotation angle range of the main axis as a center and an angle range different 180 degrees from the rotation angle range of the main axis.

18. The system for detecting a position of a check object according to claim 13, further comprising:

means for defining a representative point of the check object; and mean for matching a center of the collation template with the representative point of the check object so as to evaluate the correlation degree between the check object and the collation templates.

19. The system for detecting a position of a check object according to claim 13, further comprising:

means for collating the compressed collation templates with the compressed check image so as to detect a rough rotation angle of the check object, wherein said compressing means compresses the check image and the collation templates at a compression rate more moderate than the previous compression rate by the average compression processing after detecting the rough rotation angle, said collating means collates the compressed collation templates with the compressed check image in a proximity of the rough rotation angle so as to detect a more precise rotation angle than the rough rotation angle of the check object, and said compressing and collating means repeat compressing and collating steps while moderating the compression rate in multiple steps so as to detect the precise rotation angle of the check object.

20. A system for detecting a position of a check object using image processing, comprising:

means for picking up an image of the check object so as to prepare a check image of the check object;

means for preparing a correct solution image having a reference image of the check object;

means for compressing the check image and the correct solution image at a given compression rate by an average compression processing which calculates an average value of a brightness in a predetermined area and adopts the average value as a brightness of one pixel of the compressed check image and the compressed correct solution image, wherein said predetermined area comprises more than one pixel; and means for comparing the compressed check image and the compressed correct solution image so as to detect a rough position of the check object, wherein said compressing means compresses the check image and the correct solution image at a compression rate more moderate than the previous compression rate by the average compression processing after detecting the rough position, said comparing means compares the compressed correct solution means and the compressed check image in a proximity of the rough position so as to detect a more precise position than the rough position of the check object, and said compressing and comparing means repeat compressing and comparing steps while moderating the compression rate in multiple steps so as to detect the precise position of the check object.

21. The system for detecting a position of a check object according to claim 20, wherein said comparing means detects a plurality of the rough positions, and the system further comprising means for narrowing down the detected rough positions.

22. The system for detecting a position of a check object according to claim 20, wherein a displacement amount for detecting the rough position is smaller than a displacement amount for detecting the more precise position.

23. The system for detecting a position of a check object according to claim 20, wherein said comparing means compares the compressed correct solution means and the compressed check image by moving the compressed correct solution image according to a raster scanning for detecting the rough position, and by moving the compressed correct solution image according to the raster scanning and rotating the compressed correct solution image for detecting the more precise position.

24. The system for detecting a position of a check object according to claim 20, further comprising means for executing arithmetic of sum of products dedicated to execution of aim calculation.

* * * * *